(12) United States Patent
Medasani et al.

(10) Patent No.: US 9,485,432 B1
(45) Date of Patent: Nov. 1, 2016

(54) METHODS, SYSTEMS AND APPARATUSES FOR DUAL-CAMERA BASED ZOOMING

(71) Applicant: Uurmi Systems Private Limited, Hyderabad (IN)

(72) Inventors: Swarup Shanti Medasani, Telangana (IN); Gaurav Gajanan Bhosale, Telangana (IN); Ajinkya Santoshrao Deshmukh, Telangana (IN)

(73) Assignee: Uurmi Systems Private Limited, Telangana (IN)

( * ) Notice: Subject to any disclaimer, the term of this patent is extended or adjusted under 35 U.S.C. 154(b) by 0 days.

(21) Appl. No.: 14/699,637

(22) Filed: Apr. 29, 2015

(51) Int. Cl.
*H04N 5/232* (2006.01)
*G06T 3/40* (2006.01)
*G06K 9/50* (2006.01)
*G06K 9/40* (2006.01)

(52) U.S. Cl.
CPC ............ *H04N 5/23296* (2013.01); *G06K 9/40* (2013.01); *G06K 9/50* (2013.01); *G06T 3/4076* (2013.01); *H04N 5/23232* (2013.01)

(58) Field of Classification Search
CPC ............ H04N 5/23296; G06T 7/0079; G06T 7/0097; G06T 7/2013; G06T 7/204
USPC .......... 348/240.99, 240.1, 240.2, 240.3, 241, 348/360
See application file for complete search history.

(56) References Cited

U.S. PATENT DOCUMENTS

| | | | | |
|---|---|---|---|---|
| 2006/0275025 | A1* | 12/2006 | Labaziewicz | H04N 5/225 396/72 |
| 2008/0030592 | A1* | 2/2008 | Border | H04N 5/232 348/218.1 |
| 2016/0080657 | A1* | 3/2016 | Chou | G06T 5/50 348/360 |

* cited by examiner

*Primary Examiner* — Lin Ye
*Assistant Examiner* — Chriss Yoder, III
(74) *Attorney, Agent, or Firm* — Next ip Law Group, LLP

(57) ABSTRACT

A method and apparatus for zooming an image by a zoom factor wherein a first image without zoom and a second image with fixed optical zoom are processed to find a mapping between low resolution patches and high resolution patches that are then used for zooming the first image if the zoom factor is less than the fixed optical zoom else the mapping between low resolution patches and high resolution patches are used for zooming the second image with fixed optical zoom.

19 Claims, 6 Drawing Sheets

METHODS, SYSTEMS AND APPARATUSES FOR DUAL-CAMERA BASED ZOOMING

FIELD OF THE DISCLOSURE

The presently disclosed embodiments are generally related to the field of digital imaging, and more specifically to methods of zooming digital images.

BACKGROUND

Recent advances in image and video sensing have intensified user expectations for the visual quality of captured images and videos. Specifically, users demand capturing images with increased zoom levels and with higher resolution. In addition, forensic experts for industrial and biomedical applications require zooming of images and videos for capturing finer details. Images and videos are generally captured by means of cameras having a moveable optical lens or by means of fixed lens mobile devices. Generally, a camera having an optical lens enables rotating the optical lens for facilitating a zoom-in/zoom-out function. Optical lens rotated in the zoom-in position enables capturing a zoomed image or video. Professional cameras such as digital SLR cameras may enable using a plurality of lens that may be attached to the camera depending on the need of a user. Image formation by an optical lens is based on the focal length (f) of the camera lens, image distance (i), and the distance (D) between the object to be captured and the camera lens, the relationship is described by the equation $$\frac{1}{f} = \frac{1}{D} + \frac{1}{i}.$$

The focal length (f) is the distance between the camera lens and the point where the rays become coincident. The image distance (i) is the distance between the lens and the image formed without any losses. Therefore, as the object gets nearer to the lens, the image is reconstructed with lesser losses, since the refracted and reflected rays are coincident at defined focal length. Similarly, if the object is at a far distance from the lens and focal length as well as image distance is kept constant then the image is blurred. Therefore, for obtaining an image with minimum loss, specifically for objects placed farther away from the lens, the focal length (f) as well as the image distance (I) is required to be changed i.e. the lens itself is required to be changed leading to higher costs. Though the optical lens increases the performance of a camera with magnifying particular region, but the size and cost of the lens increases for larger optical zoom such as 6x, 8x and so on.

In case of mobile devices such as mobile phones, the manufacturers are constantly trying to reduce the size of the mobile phones, making it necessary to reduce the size of the camera while adding more imaging features. Hence, mechanical zoom methods as provided in digital SLR cameras are not efficient for mobile phones. Each year, mobile phone manufacturers add more imaging features to their handsets, causing these mobile imaging devices to converge towards feature sets and image quality that customers expect from standalone digital still cameras. Mobile phones usually provide zoomed versions of images by using software interpolation methods referred to as digital zoom. Digital zoom employs over-sampling the image and cropping and interpolating it in accordance with a desired zoom factor. However, digital zoom leads to blurring and inaccurate zoomed image due to the presence of ambiguous information about the captured objects.

Hence, there exists a need for providing methods and apparatuses that can provide zoomed images without the inclusion of bulky and expensive optical lens and at the same time providing better zoomed image quality with high resolution.

BRIEF SUMMARY

It will be understood that this disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an embodiment, a method for zooming an image by a zoom factor is provided. The method comprises a plurality of processor implemented steps. The method initially receives a first image that is an image without zoom, and also receives a second image that is an image with a predefined optical zoom. In an aspect, the method may be executed by a processing unit or a graphics processing unit also known as a GPU. In an aspect, the first image and the second image may be received from a device such as a smartphone having two cameras, wherein the first camera does not have a zoom and the second camera has a fixed zoom. In another aspect, the first image and the second image may be retrieved from a database or a storage device wherein the images are pre stored. Upon receiving the first image and the second image, a common area is determined in the first image based on the second image. The common area is then upscaled by a predefined scaling factor for determining an upscaled version of the common area. The upscaled version of the common area is divided into a first set of overlapping patch vectors. A magnitude of the first set of overlapping patch vectors is calculated by extracting the features of the first set of overlapping patch vectors and then the magnitude is stored in a Low Resolution feature vector matrix. The second image is divided into a second set of overlapping patches for determining a second set of patch vectors and the second set of patch vectors is stored as a high resolution patch vector matrix.

In case the zoom factor is lesser than the predefined optical zoom, then the first image is upscaled by the predefined optical zoom. The upscaled first image is divided into a third set of overlapping patch vectors. A magnitude is calculated for each of the patch vectors of the third set of overlapping patch vectors. The magnitude for each of the third set of overlapping patch vectors is stored into a first feature vectors matrix. The first feature vectors matrix is then used for determining one or more feature vectors of the upscaled first image that are similar to corresponding features stored in the Low Resolution feature vector matrix. The one or more features of the upscaled first image are determined based on comparing the first feature vectors matrix and the Low Resolution feature vector matrix. A second set of patch vectors is determined in the high resolution patch vector matrix corresponding to the one or more feature vectors of the upscaled first image. A first set of estimated high resolution patch vectors is reconstructed based on the Gaussian weighting of the patch vectors in the second set of patch vectors. Then, a first high frequency content is extracted by subtracting the first image from an upscaled and downscaled version of the first image, wherein the upscaled and downscaled version of the first image is obtained by firstly upscaling the first image by a scaling factor and then downscaling the upscaled first image by the scaling factor. Finally, the first high frequency content is upscaled by the scaling factor and then added to a reconstructed zoomed version of the first image.

In another case, if the zoom factor is greater than the predefined optical zoom, then the second image is upscaled by the scaling factor and then divided into a fourth set of overlapping patch vectors. A magnitude is calculated for the patch vectors of the fourth set of overlapping patch vectors by extracting the features of the fourth set of overlapping patch vectors. The magnitude of the patch vectors of the fourth set of overlapping patch vectors is then stored in a second feature vectors matrix. One or more feature vectors of the upscaled second image are determined that are similar to corresponding features stored in the Low Resolution feature vector matrix, wherein one or more features the upscaled second image are determined based on comparing the second feature vectors matrix and the Low Resolution feature vector matrix. Thereon, a third set of patch vectors is determined in the high resolution patch vector matrix corresponding to the one or more feature vectors of the upscaled second image. A second set of estimated high resolution patch vectors are reconstructed based on the Gaussian weight of the patch vectors in the third set of patch vectors. A second high frequency content is extracted by subtracting the second image from an upscaled and downscaled version of the second image, wherein the upscaled and downscaled version of the second image is obtained by firstly upscaling the second image by a scaling factor and then downscaling the upscaled second image by the scaling factor. Finally, the second high frequency content is added to a reconstructed zoomed version of the second image.

In an embodiment, an apparatus for capturing and zooming an image by a desired zoom factor is provided. The apparatus comprises of a dual camera unit, memory, and a processing unit. In an aspect, the apparatus may be a smartphone. The dual camera unit captures a first image and a second image, wherein the first image is an image without zoom and the second image is an image with a predefined optical zoom. The processing unit is configured for constructing a zoomed version of the first image by executing a program module stored in the memory wherein the execution of the program module leads to the method steps described above.

In yet another embodiment, a system for zooming an image by a zoom factor is provided. The system comprises of a storage means for storing a first image and a corresponding second image wherein the first image is an image without zoom and the second image is an image with a predefined optical zoom. The system also comprises of a computing device having a memory and a processor. The memory may be configured for storing one or more program modules. The processor of the computing device may be configured to retrieve the first image the second image and executing the one or more program modules stored in the memory for constructing a zoomed version of the first image by executing the method described above.

It is an object of the present application to provide a method without using an expensive optical lens for constructing a better zoomed image than a digital zoomed image.

It is an object of the present application to provide a cost effective method for constructing a better zoomed image which is comparable to optical zoomed image.

It is another object of the present application to provide a method for constructing a zoomed image irrespective of the distance between the object and the lens.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1a shows an image captured by a no zoom camera and FIG. 1b shows an image captured by a fixed zoom camera zooming into the highlighted portion of the image in FIG. 1a.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1B:
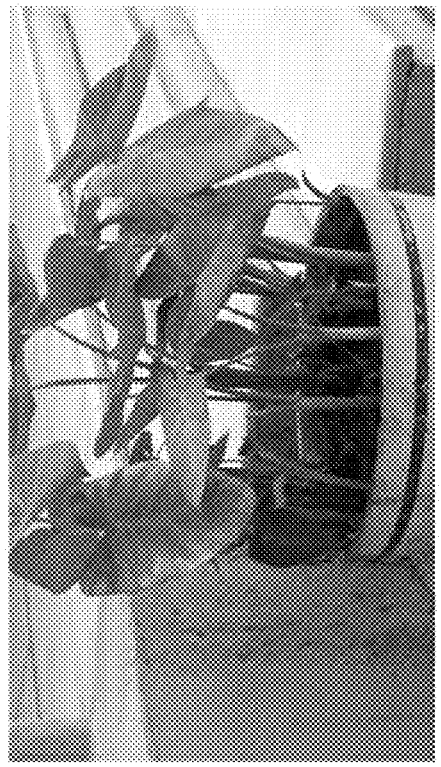
Figure 1A:
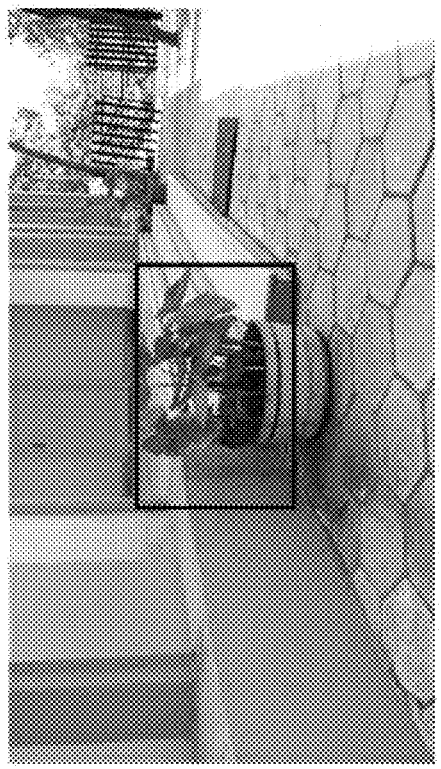

FIG. 1a shows an image captured by a no zoom camera and FIG. 1b shows an image captured by a fixed zoom camera zooming into the highlighted portion of the image in FIG. 1a. Both the images are of the same object, in the present case a plant. However, the amount of details present in the image with fixed zoom is higher than the details present in the image with no zoom. Moreover, the image with no zoom has a large field of view in comparison to the image with fixed zoom; hence, the image in FIG. 1a has a non-overlapping area and an overlapping area with image in FIG. 1b.

The method disclosed in the present disclosure tackles the case when objects are present at longer distances where the reflected and refracted rays fail to converge at a desired point and this introduces blurring in final image. The proposed approach uses a one-to-one mapping between no zoom image patches and fixed zoom image patches to learn natural image degradation process. This latent mapping is then used to create zoom images of a desired zoom factor. This reduces the blurriness and increases resolution and quality. In addition, fine details are preserved due to extraction and addition of high frequency content.

Figure 2:
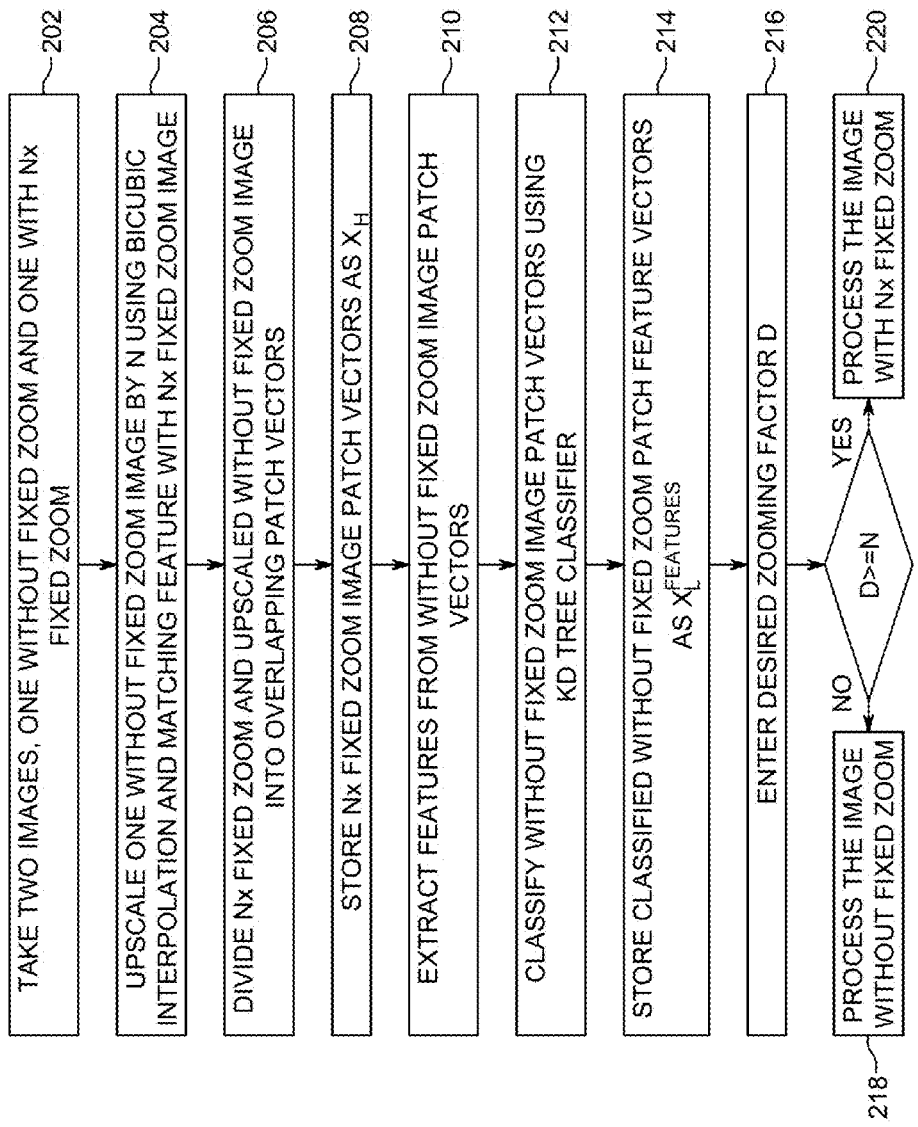
FIG. 2 shows a schematic diagram of a flowchart describing a method for processing an image without zoom and an image with an optical zoom for zooming an image.

FIG. 2 shows a schematic diagram of a flowchart describing a method for processing an image without zoom and an image with an optical zoom for creating zoomed images based on a desired zoom factor, according to an embodiment. The method according to the present embodiment processes a pair of images wherein the first image has no zoom and the second image has a N× fixed zoom. In an embodiment, N× which is fixed zoom of the second image may be in the range of 2× to 4×. In other embodiments other pair of images having multiple zoom levels may utilized without deviating from the novel aspects of the present disclosure. At step 202, the two images are received from a source such as a dual camera unit or a repository storing the images as described below. One of the images is an image without a zoom and generally has a wide field of view camera. The second image is an image with N× fixed zoom and generally a narrow field of view.

At step 204, the first image without a zoom is upscaled to the zoom factor of the second image. Then a region common to the first image with wide field of view and the second image with narrow field of view is determined. In an aspect, the region common to the two images is determined by using a local feature detection technique such as Speeded Up Robust Features technique also known as SURF feature matching. The rotation angle, shift and scaling factor of no zoom image is calculated with reference to N× fixed zoom image. Further, the common region from the first image is upscaled using bicubic interpolation based on the chosen scaling factor, such that, the upscaled version contains the same view of scene as N× fixed zoom image. Now, the N× fixed zoom image and N× upscaled image have the same size and same view.

At step 206, the upscaled common region of the first image and the second image are divided into a plurality of overlapping patch vectors.

At step 208, the overlapping patches of the second image which is the high resolution image with 3× zoom is stored as column vectors as $X_H$. Such that $$X_H = [X_{H1}, X_{H2}, \ldots, X_{HN}]$$

Where, $X_H$ is the stored High resolution vectors matrix and $X_{Hi}$ is the $i^{th}$ vector from N number HR vectors of N× fixed zoom image.

At step 210, features are extracted from the patch vectors of the upscaled common region of the first image. The features are extracted by passing each of the patch vectors from the first set of overlapping patch vectors through a first filter bank $f_1=[-1,0,1]$ to get a first order gradient $g_x$ in x-direction of patch vectors and passing each of the patch vectors through a second filter bank and $f_2=-f_1^T$ to get a first order gradient $g_y$ in y-direction of patch vectors. Then, a magnitude of the features is calculated by taking a square root of the summation of square of the first order gradient in x-direction and square of the first order gradient in y-direction. The magnitude of the low resolution feature vectors can be represented by $X_L^{Feature} = \sqrt{gx^2 + gy^2}$.

At steps 212 and 214, the magnitude of the low resolution feature vectors $X_L^{Feature}$ is stored as low resolution feature space using a KD-tree classifier algorithm. The $X_L^{Feature}$ can be represented as $$X_L^{Feature} = [X_{L1}^{Feature}, X_{L2}^{Feature}, \ldots, X_{LN}^{Feature}]$$

Where, $X_L^{Feature}$ is the stored feature vectors matrix and $X_{Li}^{Feature}$ is the $i^{th}$ vector from N number of feature vectors of upscaled common region of the no zoom image.

At step 216, a desired zoom factor is provided by a user. The image is to be zoomed to a user provided zoom factor. In case, if the zoom factor provided by the user is less than the optical zoom of the second image, then the first image which has no fixed zoom is processed at step 218 as described below in FIG. 3. In another case, if the zoom factor provided by the user is greater than the optical zoom of the second image, then the second image is processed at step 220 as described below in FIG. 4. Finally, a zoomed image based on the user provided zoom factor is generated.

In an aspect, the zoomed image may have a better contrast and higher resolution than the first image and the second image. In an example aspect, according to the present embodiment an image can be zoomed in the range of 2 times to 15 times. However, other zoom factors may also be achieved by changing the optical zoom of the second image and by also providing an optical zoom to the first image. In an aspect, the zoomed version of the image is of a preselected size between and including 2p and 15p, wherein p is the size of the first image and the second image. In an embodiment, the first image and the second image models natural image degradation parameters selected from the group consisting of sensor blur, optical blur, and atmospheric noise. In another aspect, one or more pre-processing and post processing techniques may be applied to the zoomed image. The pre-processing and post processing techniques may be selected from the group consisting of de-blurring, de-noising, contrast enhancement, and edge sharpening.

Figure 3:
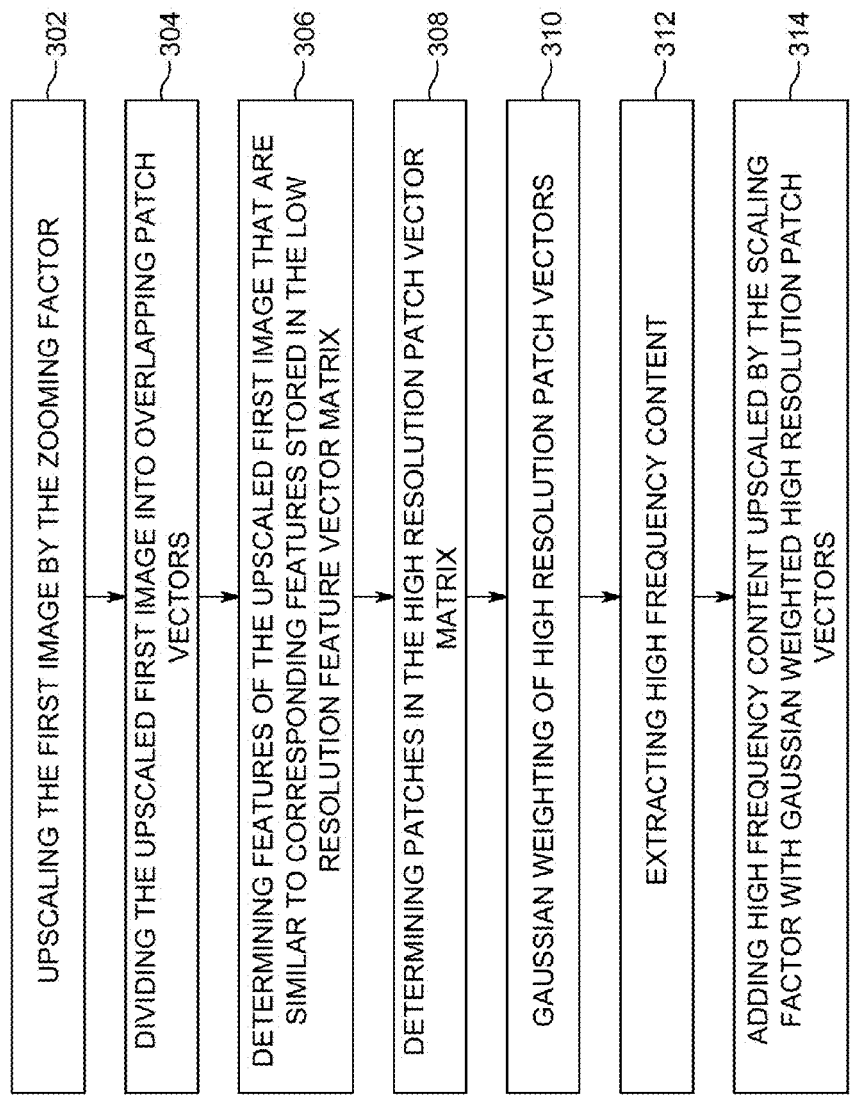
FIG. 3 shows a schematic diagram of a flowchart describing a method for zooming an image without zoom by a desired zoom factor, according to an embodiment.

FIG. 3 shows a schematic diagram of a flowchart describing a method for zooming an image without zoom by a desired zoom factor, according to an embodiment. In case, the image is required to be zoomed by a zoom factor between the zoom of the first image (1x according to the present embodiment) and the fixed optical zoom (3x according to the present embodiment) of the second image, then the first image is further processed.

A step 302, the first image is upscaled by the zoom factor entered by the user. In an aspect, the first image may be upscaled by using bicubic interpolation method.

At step 304, such an upscaled version of the first image that may be represented by $y_{upscaled}$ is divided into overlapping patch vectors.

At step 306, features are extracted from the overlapping patch vectors of the upscaled version of the first image. The features are extracted by passing each of the patch vectors through a first filter bank $f_1 = [-1,0,1]$ to get a first order gradient $g_x$ in x-direction of patch vectors and passing each of the patch vectors through a second filter bank and $f_2 = -f_1^T$ to get a first order gradient $g_y$ in y-direction of patch vectors. Then, a magnitude of the features is calculated by taking a square root of the summation of square of the first order gradient in x-direction and square of the first order gradient in y-direction. The magnitude of the features of the overlapping patch vectors of the upscaled version of the first image can be represented by $$y_{upscaled}^{Feature} = \sqrt{gx^2 + gy^2}$$

The magnitude of each of the features of the overlapping patch vectors is then stored in a first feature vector matrix $y_{upscaled}^{Feature}$, wherein $$Y_{upscaled}^{Feature} = [y_{upscaled1}^{Feature}, y_{upscaled2}^{Feature}, \ldots, y_{upscaledM}^{Feature}]$$

Where, $Y_{upscaled}^{Feature}$ is the feature vectors matrix of upscaled image $y_{upscaled}$ and $Y_{upscaledi}^{Feature}$ is the $i^{th}$ vector from M number of feature vectors of upscaled image $y_{upscaled}$. Further, the features of the upscaled first image $y_{upscaled}$ stored in first feature vector matrix $Y_{upscaled}^{Feature}$ are compared with the corresponding features stored in the low resolution feature vectors matrix $X_L^{Feature}$, and the features of $Y_{upscaled}^{Feature}$ that are similar to the features of $X_L^{Feature}$ are determined. In an aspect, the features of upscaled image $y_{upscaled}$ that are similar to the stored low resolution feature vector matrix $X_L^{Feature}$ are determined using fast and approximate nearest neighbor search methods. The search is carried out as Best-bin first algorithm for high dimensional sample space.

At step 308, the extracted feature vectors $y_{upscaled}^{Feature}$ are used to select the vectors from trained feature $X_L^{Feature}$ space using Minkowski distance metric as, $$d_j = R\sqrt{\sum_{i=1}^{n} |(X_{Li}^{Feature}) - (Y_{upscaledi}^{Feature})|^R}$$

Where, $X_{Li}^{Feature}$ is the $i^{th}$ patch feature vector from trained tree structure while $Y_{upscaledi}^{Feature}$ is the $i^{th}$ patch feature vector from upscaled image $y_{upscaled}$. Also, n is the number samples in a vector. Here, we have used R=2, that gives Euclidean distance. After the selection of k nearest neighbors, corresponding high resolution patches x are retrieved using same index of searched feature patches.

At step 310, the k numbers of retrieved high resolution patches are weighted summed according to distance from its test patch. The normalized Gaussian weights are assigned such that lesser the distance, more will be the weight assigned. Thus, the high resolution patch reconstruction with the use of Gaussian weights is as follows, $$\hat{x}_i = \frac{\sum_{j=1}^{k} W_j x_i^j}{\sum_{j=1}^{k} W_j}$$

Where, $\hat{x}_i$ is the $i^{th}$ patch reconstructed using k number of retrieved high resolution patches $x_j^i$ and weighting $W_j$. The Gaussian weighting is given by, $$W_j = \exp(-h^2 * d_j^2)$$

where, h is the patch size used for reconstruction while $d_j$ is the distance between test $j^{th}$ upscaled image feature vector and $k^{th}$ retrieved stored feature vector. Finally, a zoomed version of the image is reconstructed by combining all the reconstructed high resolution patches.

At step 312, high frequency content is extracted. The first image contains both high frequency (HF) as well as low frequency (LF) content in large amount. The HF preserves sharpness and LF preserves smoothness of an image. When image is up-scaled by interpolation then it losses high frequency (HF) content and image become blur as only LF contents are remaining Therefore, the separation and preservation of high frequency content is needed. Thus, the high frequency content is separated from the first image. The high frequency content is extracted by subtracting the first image from an upscaled and downscaled version of the first image, wherein the upscaled and downscaled version of the first image is obtained by firstly upscaling the first image by a scaling factor and then downscaling the upscaled first image by the scaling factor.

At step 314, the high frequency content is upscaled by the scaling factor and the high frequency content is added with the reconstructed zoomed version of the first image. The final zoomed image can be summarized by the equation $$x_{zoomed} = \hat{x} + \alpha x_{HF}$$

Where, $x_{zoomed}$ is the estimated zoomed image reconstructed with the addition of HF content $x_{HF}$ and estimated high resolution image $\hat{x}$. Further, $\alpha$ is the global weighting factor used to enhance HF content for fine details. In addition, a is selected such that $x_{zoomed}$ should not exceed maximum pixel value of the image.

Figure 4:
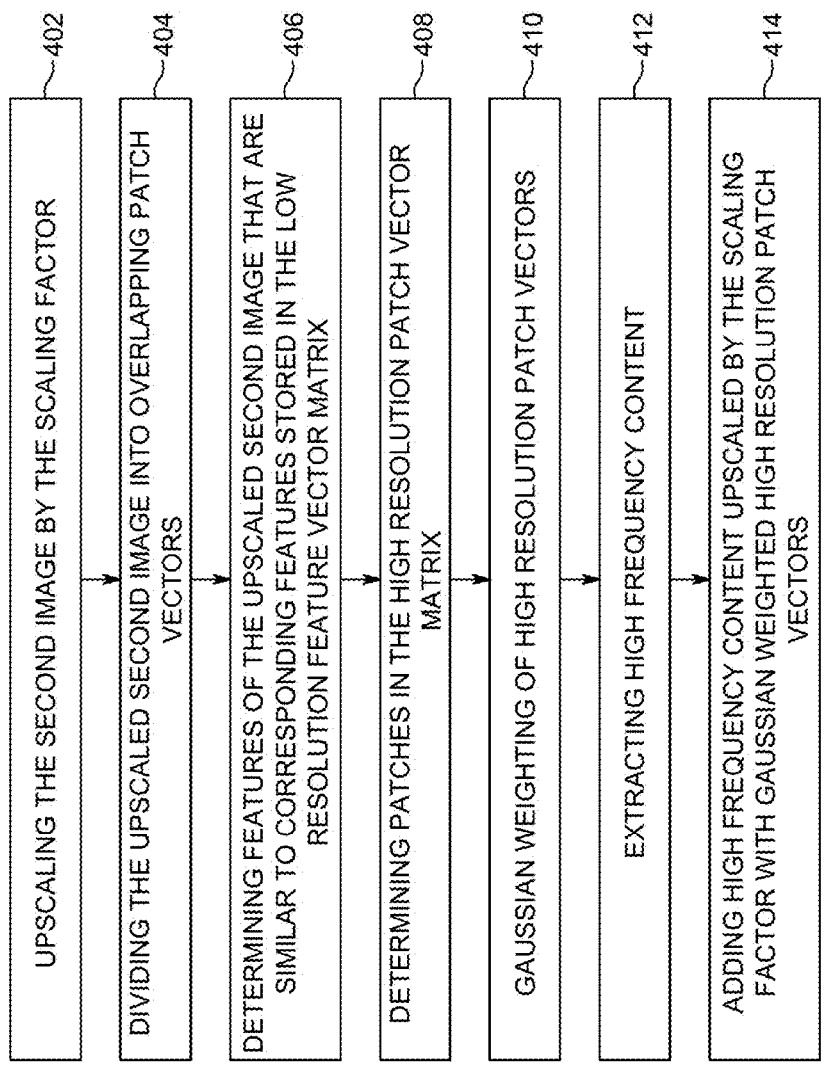
FIG. 4 shows a schematic diagram of a flowchart describing a method for zooming an image with an optical zoom by a desired zoom factor, according to an embodiment.

FIG. 4 shows a schematic diagram of a flowchart describing a method for zooming an image with an optical zoom by a desired zoom factor, according to an embodiment. In case, the image is required to be zoomed by a zoom factor greater than the optical zoom (3x according to the present embodiment) of the second image, then the second image is further processed.

A step 402, the second image is upscaled by the scaling factor entered by the user, wherein the scaling factor is one-third of the optical zoom of the second image. In an aspect, the second image may be upscaled by using bicubic interpolation method.

At step 404, such an upscaled version of the second image that may be represented by $y_{upscaled}$ is divided into overlapping patch vectors.

At step 406, features are extracted from the overlapping patch vectors of the upscaled version of the second image. The features are extracted by passing each of the patch vectors through a first filter bank $f_1=[-1,0,1]$ to get a first order gradient $g_x$ in x-direction of patch vectors and passing each of the patch vectors through a second filter bank and $f_2=-f_1^T$ to get a first order gradient $g_y$ in y-direction of patch vectors. Then, a magnitude of the features is calculated by taking a square root of the summation of square of the first order gradient in x-direction and square of the first order gradient in y-direction. The magnitude of the features of the overlapping patch vectors of the upscaled version of the second image can be represented by $$y_{upscaled}^{Feature} = \sqrt{gx^2 + gy^2}$$

The magnitude of each of the features of the overlapping patch vectors is then stored in a first feature vector matrix $Y_{upscaled}^{Feature}$ wherein $$Y_{upscaled}^{Feature} = [y_{upscaled1}^{Feature}, y_{upscaled2}^{Feature}, \ldots, y_{upscaledM}^{Feature}]$$

Where, $Y_{upscaled}^{Feature}$ is the feature vectors matrix of upscaled image $y_{upscaled}$ and $Y_{upscaledi}^{Feature}$ is the $i^{th}$ vector from M number of feature vectors of upscaled image $y_{upscaled}$. Further, the features of the upscaled second image $y_{upscaled}$ stored in first feature vector matrix $Y_{upscaled}^{Feature}$ are compared with the corresponding features stored in the low resolution feature vectors matrix $X_L^{Feature}$, and the features of $Y_{upscaled}^{Feature}$ that are similar to the features of $X_L^{Feature}$ are determined. In an aspect, the features of upscaled image $y_{upscaled}$ that are similar to the stored low resolution feature vector matrix $X_L^{Feature}$ are determined using fast and approximate nearest neighbor search methods. The search is carried out as Best-bin first algorithm for high dimensional sample space.

At step 408, the extracted feature vectors $Y_{upscaled}^{Feature}$ used to select the vectors from trained feature $X_L^{Feature}$ space using Minkowski distance metric as, $$d_j = R\sqrt{\sum_{i=1}^{n} |(X_{Li}^{Feature}) - (Y_{upscaledi}^{Feature})|^R}$$

Where, $X_{Li}^{Feature}$ is the $i^{th}$ patch feature vector from trained tree structure while $Y_{upscaledi}^{Feature}$ is the $i^{th}$ patch feature vector from upscaled image $y_{upscaled}$. Also, n is the number samples in a vector. Here, we have used R=2, that gives Euclidean distance. After the selection of k nearest neighbours, corresponding high resolution patches x are retrieved using same index of searched feature patches.

At step 410, the k numbers of retrieved high resolution patches are weighted summed according to distance from its test patch. The normalized Gaussian weights are assigned such that lesser the distance, more will be the weight assigned. Thus, the high resolution patch reconstruction with the use of Gaussian weights is as follows, $$\hat{x}_i = \frac{\sum_{j=1}^{k} W_j x_i^j}{\sum_{j=1}^{k} W_j}$$

Where, $\hat{x}_i$ is the $i^{th}$ patch reconstructed using k number of retrieved high resolution patches $x_j^i$ and weighting $W_j$. The Gaussian weighting is given by, $$W_j = \exp(-h^2 * d_j^2)$$

where, h is the patch size used for reconstruction while $d_j$ is the distance between test $j^{th}$ upscaled image feature vector and $k^{th}$ retrieved stored feature vector. Finally, a zoomed version of the image is reconstructed by combining all the reconstructed high resolution patches.

At step 412, high frequency content is extracted. The second image contains both high frequency (HF) as well as low frequency (LF) content in large amount. The HF preserves sharpness and LF preserves smoothness of an image. When image is up-scaled by interpolation then it losses high frequency (HF) content and image become blur as only LF contents are remaining Therefore, the separation and preservation of high frequency content is needed. Thus, the high frequency content is separated from the second image. The high frequency content is extracted by subtracting the first image from an upscaled and downscaled version of the second image, wherein the upscaled and downscaled version of the second image is obtained by firstly upscaling the second image by a scaling factor and then downscaling the upscaled second image by the scaling factor.

At step 414, the high frequency content is upscaled by the scaling factor and the high frequency content is added with the reconstructed zoomed version of the first image.

The final zoomed image can be summarized by the equation $$x_{zoomed} = \hat{x} + \alpha x_{HF}$$

Where, $X_{zoomed}$ is the estimated zoomed image reconstructed with the addition of HF content $x_{HF}$ and estimated high resolution image $\hat{x}$. Further, $\alpha$ is the global weighting factor used to enhance HF content for fine details. In addition, $\alpha$ is selected such that $X_{zoomed}$ should not exceed maximum pixel value of the image.

In an aspect, Pre-processing as well as post processing techniques such as debluring, denoising, contrast enhancement, edge sharpening may be used to further improve image quality. The HR reconstruction sometimes introduces undesired artifacts. Thus, the regularization is used to reduce these artifacts. The regularization is done using a block matching filter. The self-similar patches from single image are grouped into one block. In addition, the grouped block is averaged and resulting patch is replaced in the zoomed result to get a smoother solution. Furthermore, Non-Local Means (NLM) filtering, linear smoothening filters, anisotropic diffusion, etc. can also be used for regularization instead of block matching filtering. In an aspect, the zoomed image may be regularized by using a de-noising technique selected from the group comprising of block matching filtering, Non-Local Means filtering, linear smoothing filtering, anisotropic diffusion, Gabor filtering, Rudin-Osher-Fatemi Total Variation Denoising, Wiener filter, and Discrete Universal Denoiser.

Figure 5:
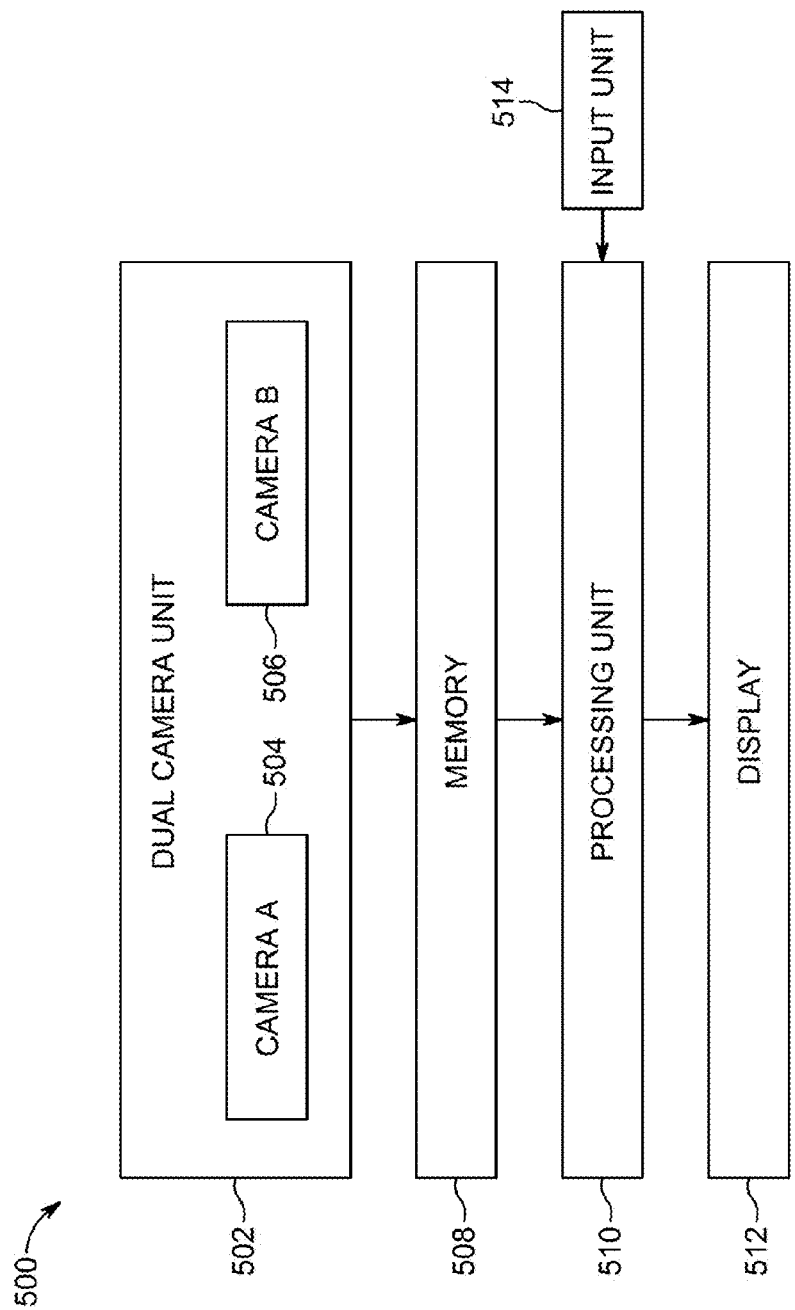
FIG. 5 is a block diagram illustrating an apparatus for capturing and zooming an image by a desired zoom factor, according to an embodiment.

FIG. 5 is a block diagram illustrating an apparatus 500 for capturing and zooming an image by a desired zoom factor, according to an embodiment. The apparatus 500 comprises of a dual camera unit 502, a memory 508, a processing unit 510, a display 512, and an input unit 514. The dual camera unit 502 comprises of a camera A 504 and a camera B 506. The camera A 504 is a no zoom camera having a wide field of view configured for capturing a no zoom picture. The camera A 504 may comprise of a first group of lenses, a charge-coupled device, and an A/D converting IC. The no zoom image captured by camera A 504 is treated as a low resolution image. The camera B 506 is a camera with a fixed optical zoom for capturing a picture having a fixed zoom. In an aspect, camera B 506 having zoom capability may be a narrow field of view camera or a normal view camera. In another aspect, camera B 506 having zoom capability may be a wide field of view camera. The camera B 506 may comprise of a second group of lenses, a charge-coupled device, an A/D converting IC. The zoomed image captured by camera B 506 is treated as a high resolution image. In example embodiment, the camera B 506 having zoom capability may have a 3× optical zoom.

In an embodiment, the dual camera unit 502 may include more than two cameras having fixed zoom which then can be used with focusing on different locations to get wide magnified view of scene. In another embodiment, the dual camera unit 502 may include a plurality of cameras having optical zoom factors such as 5×-10× pair, and the like that may be used for larger magnification factors of an input image.

The memory 508 may include a plurality of storage mechanisms such as RAM, a ROM, a magnetic recording disc, an optical storage disc, a semiconductor memory or any other kind of storage medium. The memory 508 may store one or more program modules that may be accessed and executed by processing unit 510. The memory 508 is communicatively coupled with the processing unit 510 and may be configured for storing the intermediate results of the processing done by the processing unit 510. The input unit 514 enables the user of the apparatus 500 for providing a zoom factor for zooming the captured image of the object.

The processing unit 510 is configured for receiving the images captured by camera A 504 and camera B 506 and executing one or more program modules for processing the method steps as described in FIGS. 2-4. In an aspect, the processing unit 510 may be a graphics processing unit. Specifically, the processing unit 510 is configured for determining a common area in the first image captured by camera A 504 based on the second image captured by camera B 506. The processing unit 510 then upscales the determined common area in the first image by a predefined scaling factor for determining an upscaled version of the common area. The upscaled common area is then divided into a first set of overlapping patch vectors and a magnitude of the first set of overlapping patch vectors is calculated by the processing unit 510. The second image is divided into a second set of overlapping patches for determining a second set of patch vectors and the second set of patch vectors is stored as a high resolution patch vector matrix. The one on one mapping between the low resolution patches of the image captured by camera A 504 and patches of image captured by camera B 506 is then utilized for constructing an upscaled version of the image. The processing unit specifically processes the image without zoom in case the zoom factor inputted by the user is lesser than the fixed optical zoom of camera B 506. In case the zoom factor inputted by the user is greater than the fixed optical zoom of camera B 506 then the processing unit specifically processes the image with zoom as captured by camera B 506. In an aspect, the processing unit 510 may comprise of a plurality of processors that may function in parallel for increasing the efficiency of the method described above.

The display 512 is configured for displaying an image based on a user input provided via the input unit 514. The image displayed on the display 512 may either the no zoom image captured by camera A 504, or the zoom image captured by camera B 506, or the zoomed image based on the zoom factor. In an aspect, in case of a touch-based apparatus; the input unit 514 may be combined with the display 512 as known in the art. In such a case, the input unit 514 may also enable a user to pinch zoom a particular image displayed on the display 512. The dual camera unit 502 is configured for simultaneously capturing image an object and processing the captured images for producing a zoomed image based on a user desired zoom factor. In an aspect, the object may be placed more than 500 meters from the dual camera unit.

Figure 6:
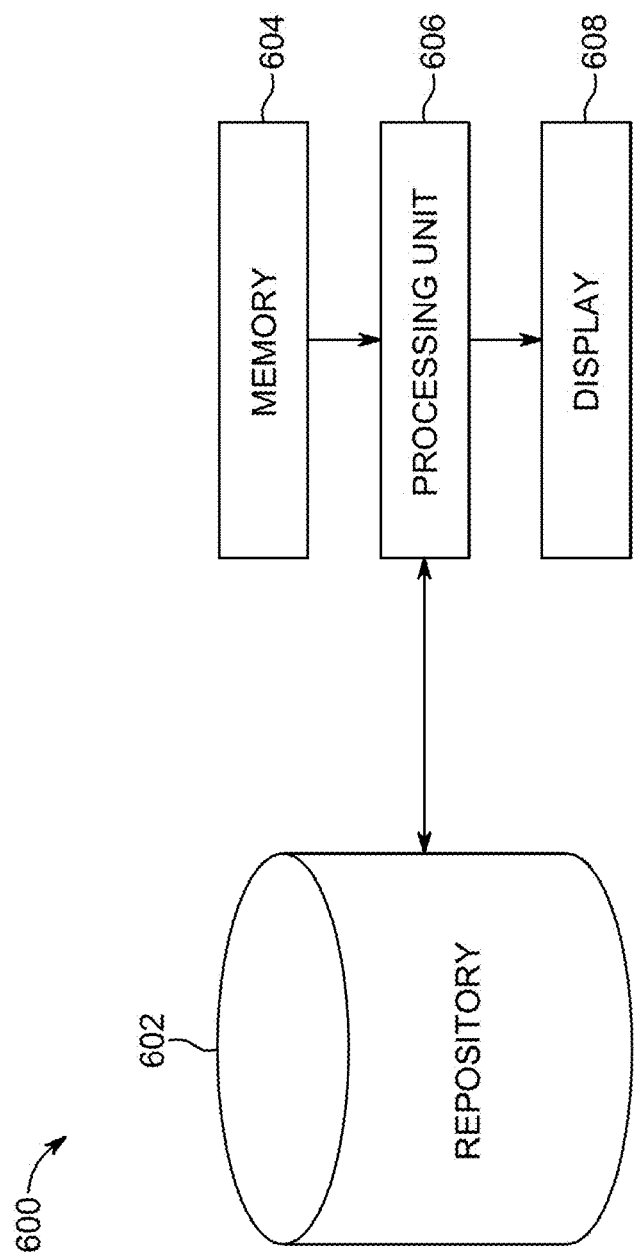
FIG. 6 is a block diagram illustrating a system for zooming an image by a desired zoom factor, according to an embodiment.

FIG. 6 is a block diagram illustrating a system 600 for zooming an image by a desired zoom factor, according to an embodiment. The system 600 comprises of a repository 602, memory 604, processing unit 606, and a display 608. In an aspect, the repository 602 may be a part of server which is connected to a client comprising the memory 604, processing unit 606, and display 608. The repository 602 may store a plurality of images including a pair of images wherein one image may be without zoom and the other image may be with an optical zoom. The image of the object captured in the pair of images may be required to be zoomed based on a zoom factor. The memory 604 may include a plurality of storage mechanisms such as RAM, a ROM, a magnetic recording disc, an optical storage disc, a semiconductor memory or any other kind of storage medium. The memory 604 may store one or more program modules that may be accessed and executed by processing unit 606. The memory 604 is communicatively coupled with the processing unit 606 and may be configured for storing the intermediate results of the processing done by the processing unit 606. The processing unit 606 is configured for executing one or more program modules for processing the method steps as described in FIGS. 2-4 for producing a zoomed version of an image. In an aspect, the processing unit 606 may be a graphics processing unit. The display 608 is configured for displaying the zoomed image. In an aspect, offline as well as online zoom estimation may be possible.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for zooming an image by a zoom factor, comprising the steps of:
   receiving a first image and a second image, wherein the first image is an image without zoom and the second image is an image with a predefined optical zoom;
   determining a common area in the first image based on the second image;
   upscaling the determined common area in the first image by a predefined scaling factor for determining an upscaled version of the common area;
   dividing the upscaled version of the common area into a first set of overlapping patch vectors and calculating a magnitude of the first set of overlapping patch vectors by extracting the features of the first set of overlapping patch vectors and then storing the magnitude in a Low Resolution feature vector matrix;
   dividing the second image into a second set of overlapping patches for determining a second set of patch vectors and the second set of patch vectors is stored as a high resolution patch vector matrix;
   if the zoom factor is lesser than the predefined optical zoom, then
   upscaling the first image by the predefined optical zoom;
   dividing the upscaled first image into a third set of overlapping patch vectors and calculating a magnitude of the third set of overlapping patch vectors by extracting the features of the third set of overlapping patch vectors and then storing the magnitude in a first feature vectors matrix;
   determining one or more feature vectors of the upscaled first image that are similar to corresponding features stored in the Low Resolution feature vector matrix, wherein one or more features the upscaled first image are determined based on comparing the first feature vectors matrix and the Low Resolution feature vector matrix;
   determining a second set of patch vectors in the high resolution patch vector matrix corresponding to the one or more feature vectors of the upscaled first image;
   reconstructing a first set of estimated high resolution patch vectors based on the Gaussian weighting of the patch vectors in the second set of patch vectors;
   extracting a first high frequency content by subtracting the first image from an upscaled and downscaled version of the first image, wherein the upscaled and downscaled version of the first image is obtained by firstly upscaling the first image by a scaling factor and then downscaling the upscaled first image by the scaling factor;
   upscaling the first high frequency content by the scaling factor and adding a reconstructed zoomed version of the first image;
   if the zoom factor is greater than the predefined optical zoom, then
   upscaling the second image by the scaling factor;
   dividing the upscaled second image into a fourth set of overlapping patch vectors and calculating a magnitude of the fourth set of overlapping patch vectors by extracting the features of the fourth set of overlapping patch vectors and then storing the magnitude in a second feature vectors matrix;
   determining one or more feature vectors of the upscaled second image that are similar to corresponding features stored in the Low Resolution feature vector matrix, wherein one or more features the upscaled second image are determined based on comparing the second feature vectors matrix and the Low Resolution feature vector matrix;
   determining a third set of patch vectors in the high resolution patch vector matrix corresponding to the one or more feature vectors of the upscaled second image;
   reconstructing a second set of estimated high resolution patch vectors based on the Gaussian weight of the patch vectors in the third set of patch vectors;
   extracting a second high frequency content by subtracting the second image from an upscaled and downscaled version of the second image, wherein the upscaled and downscaled version of the second image is obtained by firstly upscaling the second image by a scaling factor and then downscaling the upscaled second image by the scaling factor;
   upscaling the second high frequency content by the scaling factor and adding a reconstructed zoomed version of the second image.

2. The method as claimed in claim 1, further comprising regularizing the zoomed version of the first image or the zoomed version of the second image by using a de-noising technique selected from the group comprising of block matching filtering, Non-Local Means filtering, linear smoothing filtering, anisotropic diffusion, Gabor filtering, Rudin-Osher-Fatemi Total Variation Denoising, Wiener filter, and Discrete Universal Denoiser.

3. The method as claimed in claim 1, wherein the step of calculating a magnitude for each of the patch vectors from the first set of overlapping patch vectors comprises
   passing each of the patch vectors from the first set of overlapping patch vectors through a first filter bank $f_1=[-1,0,1]$ to get a first order gradient in x-direction of patch vectors and passing each of the patch vectors through a second filter bank and $f_2=-f_1^T$ to get a first order gradient in y-direction of patch vectors; and taking a square root of the summation of square of the first order gradient in x-direction and square of the first order gradient in y-direction.

4. The method as claimed in claim 1, wherein the step of storing the calculated magnitude for each of the patch vectors in a Low Resolution feature vector matrix is based on KD-Tree classifier.

5. The method as claimed in claim 1, wherein the step of calculating a magnitude for each of the patch vectors from the third set of overlapping patch vectors comprises
passing each of the patch vectors from the third set of overlapping patch vectors through a first filter bank $f_1=[-1,0,1]$ to get a first order gradient in x-direction of patch vectors and passing each of the patch vectors through a second filter bank and $f_2=-f_1^T$ o get a first order gradient in y-direction of patch vectors; and
taking a square root of the summation of square of the first order gradient in x-direction and square of the first order gradient in y-direction.

6. The method as claimed in claim 1, wherein the step of calculating a magnitude for each of the patch vectors from the fourth set of patch vectors comprises
passing each of the patch vectors from the fourth set of overlapping patch vectors through a first filter bank $f_1=[-1,0,1]$ to get a first order gradient in x-direction of patch vectors and passing each of the patch vectors through a second filter bank and $f_2=-f_1^T$ to get a first order gradient in y-direction of patch vectors; and
taking a square root of the summation of square of the first order gradient in x-direction and square of the first order gradient in y-direction.

7. The method as claimed in claim 1, wherein the first image is upscaled by the predefined optical zoom by means of bicubic interpolation.

8. The method as claimed in claim 1, wherein the scaling factor is one-third of the zoom factor.

9. The method as claimed in claim 1, wherein the image can be zoomed in the range of 2 times to 15 times.

10. The method as claimed in claim 1, wherein the high frequency content may be assigned a global weighting parameter for improving the overall sharpness of the zoomed image.

11. The method as claimed in claim 1, wherein the zoomed image has a greater contrast and higher resolution than the first image and the second image.

12. The method as claimed in claim 1, wherein information outside the view of the second image is extrapolated.

13. The method as claimed in claim 1, wherein the low resolution patch feature vector is one on one mapped to the high resolution patch vector thereby reducing blurriness and increasing the image quality of estimated zoomed version.

14. The method as claimed in claim 1 further comprising one or more pre-processing and post processing techniques selected from the group consisting of de-blurring, de-noising, contrast enhancement, and edge sharpening.

15. The method as claimed in claim 1, wherein the zoomed version of the image is of a pre-selected size between and including 2p and 15p, wherein p is the size of the first image and the second image.

16. The method as claimed in claim 1, wherein the first image and the second image models natural image degradation parameters selected from the group consisting of sensor blur, optical blur, and atmospheric noise.

17. An apparatus for capturing and zooming an image by a desired zoom factor, comprising a dual camera unit captures a first image and a second image, wherein the first image is an image without zoom and the second image is an image with a predefined optical zoom; and a processing unit for determining a common area in the first image based on the second image;

upscaling the determined common area in the first image by a predefined scaling factor for determining an upscaled version of the common area;

dividing the upscaled version of the common area into a first set of overlapping patch vectors and calculating a magnitude of the first set of overlapping patch vectors by extracting the features of the first set of overlapping patch vectors and then storing the magnitude in a Low Resolution feature vector matrix;

dividing the second image into a second set of overlapping patches for determining a second set of patch vectors and the second set of patch vectors is stored as a high resolution patch vector matrix;

if the zoom factor is lesser than the predefined optical zoom, then upscaling the first image by the predefined optical zoom;

dividing the upscaled first image into a third set of overlapping patch vectors and calculating a magnitude of the third set of overlapping patch vectors by extracting the features of the third set of overlapping patch vectors and then storing the magnitude in a first feature vectors matrix;

determining one or more feature vectors of the upscaled first image that are similar to corresponding features stored in the Low Resolution feature vector matrix, wherein one or more features the upscaled first image are determined based on comparing the first feature vectors matrix and the Low Resolution feature vector matrix;

determining a second set of patch vectors in the high resolution patch vector matrix corresponding to the one or more feature vectors of the upscaled first image;

reconstructing a first set of estimated high resolution patch vectors based on the Gaussian weighting of the patch vectors in the second set of patch vectors;

extracting a first high frequency content by subtracting the first image from an upscaled and downscaled version of the first image, wherein the upscaled and downscaled version of the first image is obtained by firstly upscaling the first image by a scaling factor and then downscaling the upscaled first image by the scaling factor;

upscaling the first high frequency content by the scaling factor and adding a reconstructed zoomed version of the first image;

if the zoom factor is greater than the predefined optical zoom, then upscaling the second image by the scaling factor;

dividing the upscaled second image into a fourth set of overlapping patch vectors and calculating a magnitude of the fourth set of overlapping patch vectors by extracting the features of the fourth set of overlapping patch vectors and then storing the magnitude in a second feature vectors matrix;

determining one or more feature vectors of the upscaled second image that are similar to corresponding features stored in the Low Resolution feature vector matrix, wherein one or more features the upscaled second image are determined based on comparing the second feature vectors matrix and the Low Resolution feature vector matrix;

determining a third set of patch vectors in the high resolution patch vector matrix corresponding to the one or more feature vectors of the upscaled second image;

reconstructing a second set of estimated high resolution patch vectors based on the Gaussian weight of the patch vectors in the third set of patch vectors;

extracting a second high frequency content by subtracting the second image from an upscaled and downscaled version of the second image, wherein the upscaled and downscaled version of the second image is obtained by firstly upscaling the second image by a scaling factor and then downscaling the upscaled second image by the scaling factor;

upscaling the second high frequency content by the scaling factor and and adding a reconstructed zoomed version of the second image.

18. The apparatus as claimed in claim 17, wherein the dual camera unit includes a wide field of view camera without zoom and a wide field of view or a narrow field of view camera with fix zoom.

19. The apparatus as claimed in claim 17, wherein the image is of an object placed more than 500 meters from the dual camera unit.

* * * * *